UNITED STATES PATENT OFFICE.

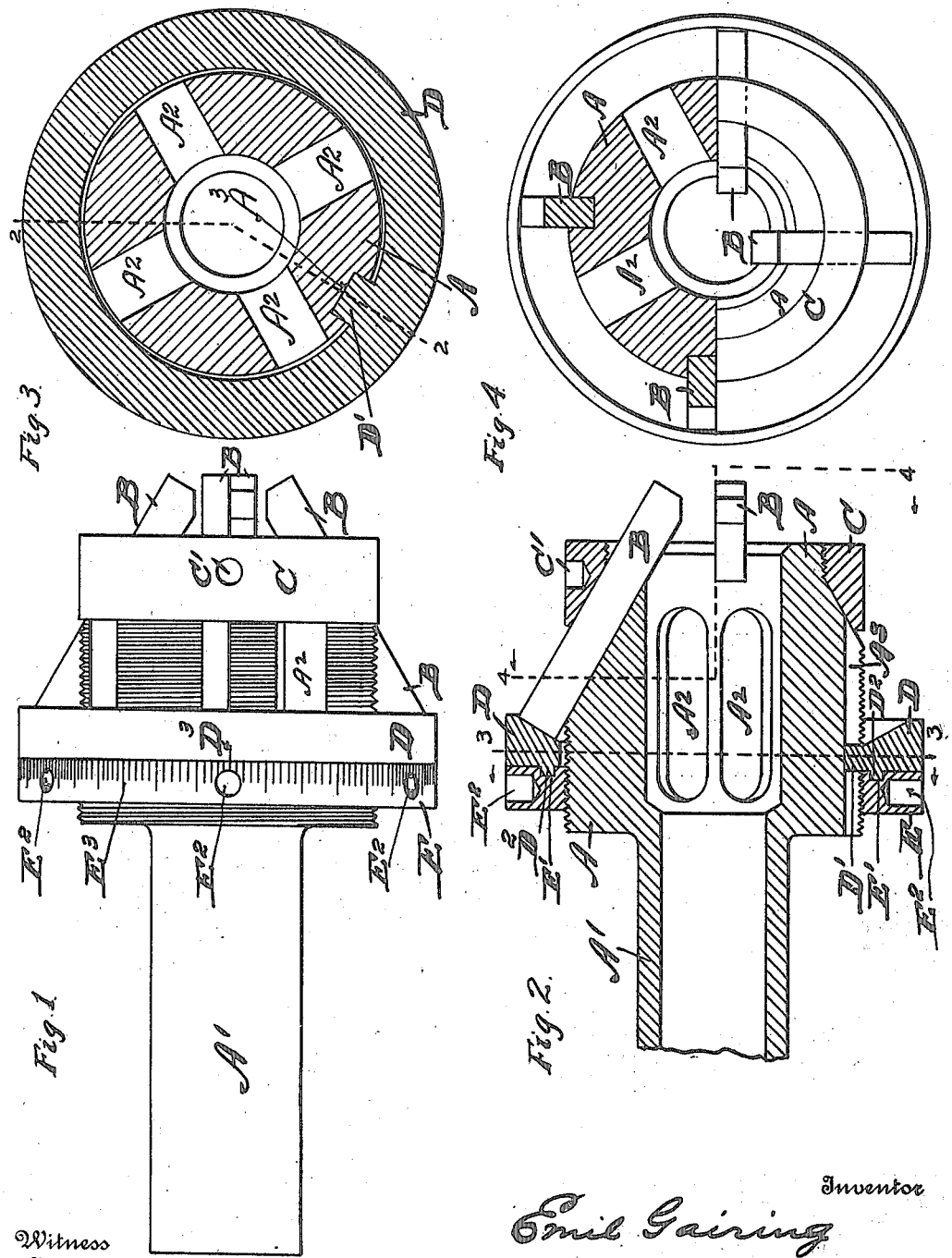

EMIL GAIRING, OF DETROIT, MICHIGAN, ASSIGNOR TO ECLIPSE INTERCHANGEABLE COUNTERBORE CO., OF DETROIT, MICHIGAN, A CORPORATION OF MICHIGAN.

HOLLOW MILLING-TOOL.

1,255,304.

Specification of Letters Patent.

Patented Feb. 5, 1918.

Application filed May 5, 1917. Serial No. 166,545.

*To all whom it may concern:*

Be it known that I, EMIL GAIRING, a citizen of the United States, residing at Detroit, county of Wayne, State of Michigan, have invented a certain new and useful Improvement in Hollow Milling-Tools, and declare the following to be a full, clear, and exact description of the same, such as will enable others skilled in the art to which it pertains to make and use the same, reference being had to the accompanying drawings, which form a part of this specification.

My invention relates to a hollow milling tool, shown in the accompanying drawings and more particularly pointed out in the following specification and claims.

One object of this invention is to provide means whereby a general adjustment of the cutting blades may be primarily secured:— to be followed by a micrometer adjustment of said cutting blades for accurate work.

As ordinarily constructed milling tools of a somewhat similar type have been provided with a cone-shaped rotatable nut, adapted to bear against the ends of the cutting blades, but it has been found in practice that the inclined face of the nut wears rapidly (due to rotation while in contact with the cutting blades) producing an uneven surface resulting in an irregular setting of the blades:—therefore another object of the present invention is to provide means adapted to insure a proper adjustment of the cutting blades and which will relieve the co-acting parts of unequal wear:—said means comprising a slidable collar against which the ends of the cutting tools bear, the collar being keyed to insure it against turning thereby relieving it of the wear incident to its rotation while in contact with the edges of the blades. Acting in conjunction with the slidable collar, is a nut by which a micrometer adjustment of the collar, and thereby the cutting blades, may be effected.

Another feature of the invention is the means employed for maintaining the slidable collar in concentric relation to the axis of the tool at all points of adjustment, thus insuring the alinement of the several cutting blades upon the same plane.

Another object of this invention is to provide for the reception of stock or bars of practically any length, the shank of the tool being hollow that the work may pass through.

Another object of this invention is to provide means for the discharge of chips as rapidly as they may be formed, thus greatly increasing the efficiency of the tool.

With the foregoing and other objects in view which will appear as the description proceeds, the invention resides in the combination and arrangement of parts and in the details of construction hereinafter described and claimed, it being understood that changes may be made in the precise embodiment herein disclosed without departing from the spirit of the invention.

In the drawings accompanying this specification:—

Figure 1 is a side elevation of a hollow milling tool.

Fig. 2 is a longitudinal sectional view on line 2—2 of Fig. 3.

Fig. 3 is a cross sectional view on line 3—3 of Fig. 2.

Fig. 4 is a partial end and cross sectional view taken on line 4—4 of Fig. 2, looking in the direction of the arrows.

Referring now to the letters of reference placed upon the drawings.

A, denotes the body of the milling tool and A', its tubular shank by which it is secured to a drill press or other machine. $A^2$, designates a plurality of radial openings through the body of the tool for the discharge of chips. B, indicates a plural number of cutting blades lodged in the inclined recesses provided in the wall of the body portion of the tool. C, denotes a locking collar screw-threaded upon the end of the body portion of the tool,—the latter being reduced in diameter at its outer end to receive the ring.

The inner face of the locking collar C, is beveled to present a surface parallel with the edge of the cutting blades when the latter are lodged in the inclined grooves of said body portion, the collar coöperating with the body to lock the blades in position.

C', are recesses in the locking collar to receive a suitable spanner wrench, or other tool, whereby the ring may be adjusted.

D, indicates a sliding ring having a key D', extending into a slotted way $A^3$, formed in the wall of the body portion of the milling tool, that the ring may be held against rotation.

E, designates an adjustable nut having a screw-threaded engagement with the body of the tool, and provided with an annular recess E', to receive a projecting rib D², carried by the sliding ring D. E², are radial holes bored in the nut to receive a suitable spanner wrench or other tool, for adjusting the nut.

E³, indicates a series of graduations on the periphery of the nut, and D³, is a suitable index mark on the sliding ring by means of which the degree of adjustment given to the sliding ring by the rotation of nut may be determined.

Having indicated the several parts by reference letters, the construction and operation of the device will be readily understood. The cutting blades are first given a general adjustment to adapt them for the work they are to operate upon:—the locking collar C, being adjusted to loosely support the blades, but not to securely lock them in place. The sliding ring D, whose inclined face bears upon the ends of the cutting blades, is then given a micrometer adjustment by means of the screw-threaded nut E, (the degree being determined by a reading of the graduated scale on the nut) thereby accurately setting the blades for the work they are about to operate upon. The locking collar C, is then adjusted to secure the cutting blades against displacement.

It will be noted that the sliding ring is held at right angles to the axis of the tool and against sagging through the coördination of the annular rib D², carried by the sliding ring, and the recess E', provided in the nut for the reception of the rib:—thus the ends of the cutting blades are severally maintained on the same plane with their cutting edges parallel.

It will be noted that the chips formed by the operation of the tool are discharged through the openings A², as rapidly as they may be produced: and that parts of greater or less length may be accommodated due to the fact that the shank is hollow to permit the passage of the work therethrough.

Having thus described my invention what I claim is:—

1. A milling tool, comprising a body provided with inclined recesses, cutting blades seated in said recesses, a lock ring threaded on the forward portion of the body and engaging the cutting blades to secure them in the said recesses, a member slidable on the rear portion of the body and held from turning thereon and in contact with the cutting blades, and a nut threaded on the body in the rear of the member for adjusting the latter and the cutting blades, there being a matching annular rib and recess between the member and nut to hold them in fixed relative position.

2. In a hollow milling tool, a body portion provided with a central opening and longitudinal tapering slots, cutting blades fitted in said slots, a locking collar screw-threaded upon the forward end of the body and adapted to engage the edges of the cutter blades, a slidable ring keyed to the body portion having on one side a bevel face to receive the end of the cutter blades, and on its opposite face a projecting annular rib, an adjustable nut having a screw-threaded engagement with the body portion, provided with an annular recess to receive the annular rib of the slidable ring, whereby the ring may be supported concentric to the axis of the body portion.

In testimony whereof, I sign this specification in the presence of two witnesses.

EMIL GAIRING.

Witnesses:
L. E. THOMAS,
C. H. MICHELL.

Copies of this patent may be obtained for five cents each, by addressing the "Commissioner of Patents, Washington, D. C."